July 6, 1943.  J. D. NIXON  2,323,839
FLUID FLOW CONTROL DEVICE
Filed Jan. 27, 1941  5 Sheets-Sheet 4

Inventor
JEDDY D. NIXON

Inventor
JEDDY D. NIXON

Patented July 6, 1943

2,323,839

UNITED STATES PATENT OFFICE 2,323,839

FLUID FLOW CONTROL DEVICE

Jeddy D. Nixon, Houston, Tex.

Application January 27, 1941, Serial No. 376,117

22 Claims. (Cl. 50—11)

This invention relates to new and useful improvements in fluid flow control devices.

This application involves certain improvements upon the apparatus set forth in my copending application, Serial No. 327,181, filed April 1, 1940.

One object of the invention is to provide an improved fluid flow control device that serves the same purposes and functions as the flow device in the above application, and is an improvement thereon in action, structure and control.

Another important object of the invention is to provide an improved fluid flow control device which has the flow passage therethrough either in a full open or a completely closed position, whereby any reduction of pressure in said passage is prevented and the freezing up or restricting of said passageway is eliminated.

There are several disadvantages to the regulators now on the market and these are: the freezing of the flow passage through said regulator, caused by a partially opened valve therein and the reduction of pressure across said valve and in said passage; and the excessive operation of said regulator, causing rapid wear of the moving parts and frequent replacements thereof, is caused by the point of reduction being in or next to the regulator. The regulators are usually set from a few feet to eight or ten miles or more from the point of use or delivery, whereby the long line causes line loss or pressure drop due to the friction of said pressure fluid within said line, and whereby said regulators may have to operate a large number of times to deliver the required pressure to the point of use (the longer the line the more times the regulator has to operate) and a small reduction of pressure at the point of use sets said regulator into operation again. The present day regulators are built to operate on a small pressure differential between the "upstream" side and the "downstream" side of said regulator and when the same opens, the valve only opens sufficiently to pass a small amount of pressure fluid (this slight opening of the valve will reduce the pressure fluid flowing through said valve) and this small amount of reduced fluid is introduced into the line against the reduced pressure therein which causes the required closing pressure to be readily built up in said regulator and close the same. Of course, this pressure will "spread out" or equalize (as all fluids seek their own level and equalize their pressure), so that the pressure will be reduced and the regulator again has to open to admit more fluid. Thus, it will be seen that it is necessary for the regulator to operate an excessive number of times to deliver the required pressure and the longer the line and the greater amount of fluid used, the more number of times said regulator operates.

Applicant's regulator does not have any reduction of pressure occurring in or next to the flow passage thereof, as his point of reduction is removed to a spaced point therefrom. Also, applicant's regulator has his control mechanism connected into said line beyond the point of reduction. This control mechanism may be set to open the valve in the flow passage at a predetermined pressure and to hold said valve completely open until a predetermined pressure is built up beyond the point of reduction, at which time the valve is then closed. The difference between the predetermined pressures of opening and closing said valve is calculated to deliver the required pressure at the point of delivery or use and in the quantity needed according to the consumption. With applicant's regulator, the parts are operated one-fourth ($\frac{1}{4}$) to one-third ($\frac{1}{3}$) of the time required to pass the necessary fluid and remain inactive two-thirds ($\frac{2}{3}$) to three-fourths ($\frac{3}{4}$) of said time, so that the operation and wear on the parts are materially reduced and their life increased.

An important object of the invention is to provide an improved fluid flow control device so constructed that the control mechanism therefor may be regulated and set for any desired adjustment to control the opening and closing of the flow passage therethrough necessary to handle the required amount of fluid, so as to deliver and maintain any predetermined pressure desired.

Another object of the invention is to provide an improved fluid flow control device the control mechanism of which is so arranged that it may be set to permit the passage of a predetermined quantity of fluid with a minimum of operation, whereby the desired working pressure may be maintained and the required volume permitted to flow through said passage with a minimum amount of opening and closing thereof.

Still another important object of the invention is to provide an improved fluid flow control device in which the control mechanism therefor is so constructed that a selective pressure differential for operating the mechanism is obtained.

A further object of the invention is to provide an improved fluid flow control device so constructed that the wear on the parts is reduced and the replacement thereof substantially eliminated.

A construction designed to carry out the invention will be hereinafter described, together with other features and objects of the invention.

The invention will be more readily understood from a reading of the following specification and by reference to the accompanying drawings, in which an example of the invention is shown, and wherein:

The numeral 15 designates a valve body having internally screw-threaded boxes 16 and 16' diametrically opposite each other for receiving the externally screw-threaded pins of an inlet pipe 17 and an outlet or discharge pipe 17' respectively. The lower end of said body is provided with an externally threaded drain or cleanout plug 18 for removing the valve member in said body, as well as any extraneous matter accumulated therein.

The upper end of said body is provided with an upstanding, externally screw-threaded boss 19 for receiving a supporting bracket or column 20. The upper end of this bracket is provided with a radially extending, external flange 21 having a plurality of bolt holes 22 therein. An annular crown or cap 23 is superimposed upon said flange 21 and a plurality of bolts 24 extend through said bolt holes 22 and are threaded into the underside of said crown 23, whereby the crown is clamped to the flange 21.

A suitable diaphragm 25 is inserted between the flange and the crown and clamped therein by said bolts 24. The upper end of the bracket 20 is formed with a piston chamber 26 in which a piston 27 is reciprocably mounted. The upper surface of the outer edge of said piston is cut or reduced to form a radially extending flange or supporting lip 28 to receive an adapter ring 29 and this ring 29 is undercut on its outer edge to engage a shoulder 30 in said piston chamber 26, in order to limit the downward travel of said ring. The upper surface of said ring is curved or rounded, as will be seen in Figures 2 and 3, so that no sharp corners or edges are presented to the underside of said diaphragm 25, whereby the upper surface of the ring 29 and the piston 27 present a more or less continuous, smooth supporting surface for said diaphragm. The piston 27 is mounted on the upper end of an upright valve.stem 31 extending downwardly therefrom and the upper surface of said piston is provided with an annular, axial sump or recess 32 (Figures 2 and 3) for receiving a nut 33 for locking said piston on the valve stem 31. This recess 32 is closed by a flat, circular plate or cover 34 having a depending, annular skirt 35 for engaging within said recess, whereby a removable cover is had for said recess 32 and a continuous surface thereacross is obtained.

The valve stem 31 extends downwardly through a stuffing box 36 mounted on the upper end of the boss 19 of said valve body 15. This stuffing box contains a suitable packing 37 and rotatable cap 38 for moving the usual follower block 39 to tighten said packing. The lower end of said valve stem is provided with a flat, annular valve member 40 for engaging a removable valve seat 41 threaded into the underside of a port 42 of a transverse, dividing partition 43 in said valve body (Figures 2 and 3).

Figure 2:
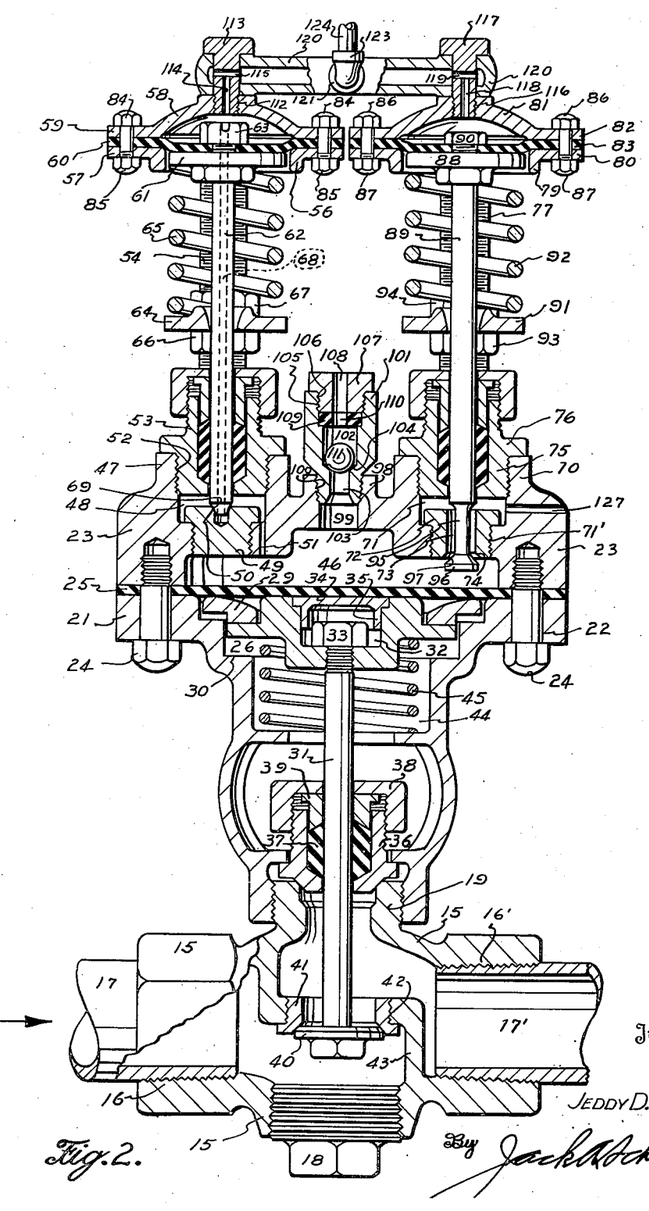
Figure 2 is a view, partly in section and partly in elevation, showing the details of the fluid flow control device in a closed position.
Figure 3:
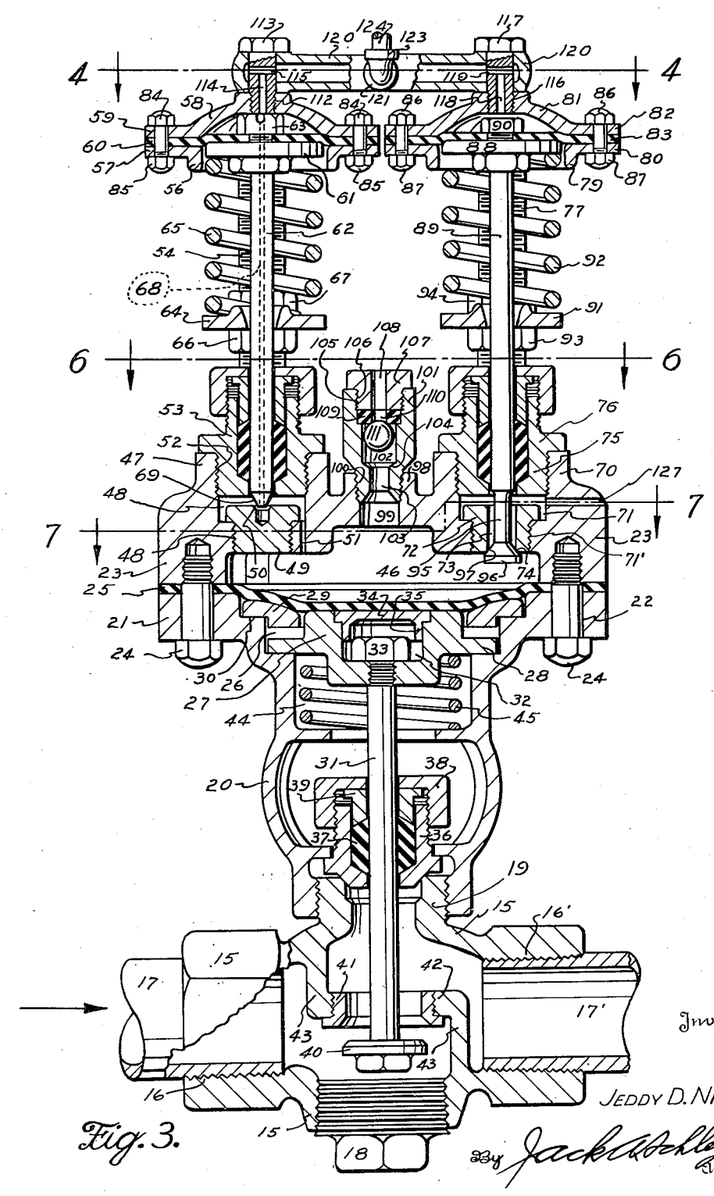
Figure 3 is a similar view, showing the device in an open position to pass fluid therethrough.
Figure 4:
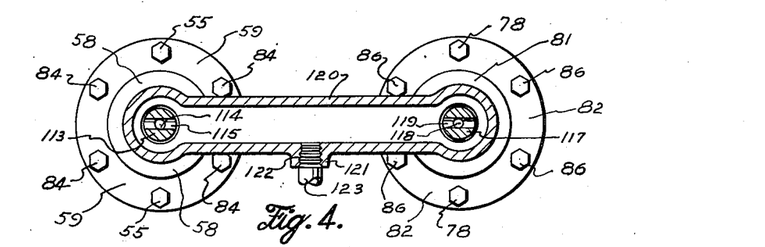
Figure 4 is a horizontal, cross-sectional view taken on the line 4—4 of Figure 3.
Figure 5:
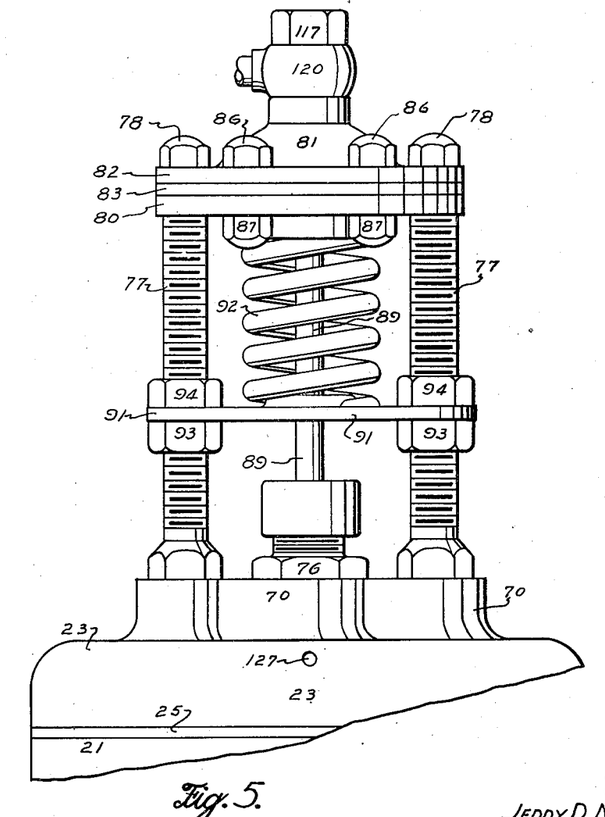
Figure 5 is a view of the control mechanism, taken at right angles to Figures 2 and 3.
Figure 6:
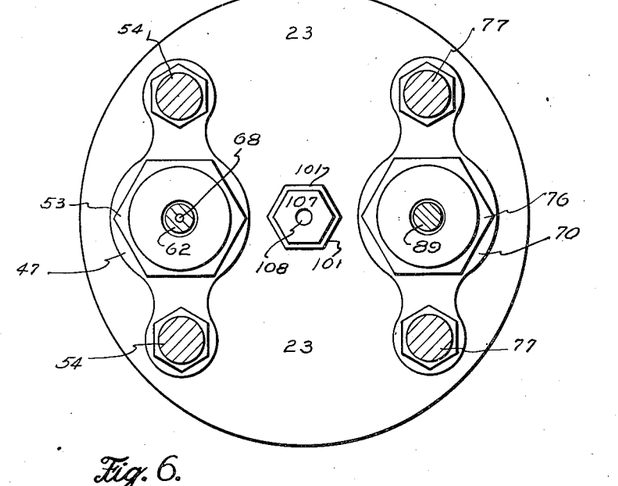
Figure 6 is a horizontal, cross-sectional view taken on the line 6—6 of Figure 3.

It will be seen from Figures 2 and 3, that the flow of fluid from the pipe 17, through the valve body, into the pipe 17' has to flow through the removable seat 41 and this flow will be controlled by the opening and closing of the valve member 40 on the seat 41. It is also pointed out that the opening through this seat 41 is rather large and will permit, when said valve member 40 is off its seat, an uninterrupted flow of fluid therethrough. Also, when the valve member is opened (Figure 3) it is at a sufficient distance from said seat as to not interfere with the flow of fluid through said seat. The valve member 40 has only two positions which are its closed position as shown in Figure 2, or its full open position as shown in Figure 3; there is no intermediate position. The drain plug 18 permits the easy removal of said valve stem 31 and valve member 40 and the seat 41, as well as the replacement of these parts in case of wear or damage.

The upper end of the bracket 20 is provided with a spring chamber 44 which extends into the lower end of said piston chamber 26 and a suitable coil spring 45 is mounted in said chamber and extends into the lower end of said piston chamber to engage the undersurface of said piston 27, whereby an upward tension or thrust is exerted upon said piston to hold said valve 40 against its seat 42 when said regulator is being shipped.

Figure 7:
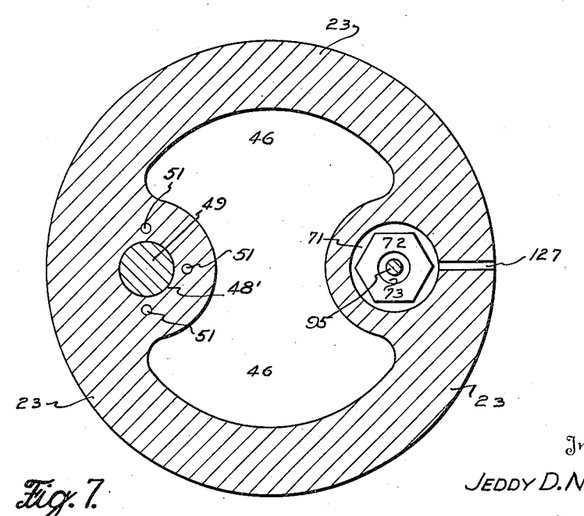
Figure 7 is a similar view taken on the line 7—7 of Figure 3.

As will be seen in Figures 2, 3 and 7, the undersurface of said crown 23 is undercut or hollowed to form a chamber 46 on the upper surface of the central portion of said diaphragm 25. The upper surface of the crown 23 is provided on one side of center with an upstanding boss 47, which has an axial port 48 extending therethrough from said chamber 46. The lower portion of this port 48 is counterbored at 48' and threaded to receive a plug 49, the upper surface of which is countersunk to form a seat 50. The shoulder formed between the counterbore 48' and the port 48 is provided with one or more small passageways 51, which are not contacted nor covered by said plug 49. The upper end of said port 48 is internally screw-threaded to receive the depending pin 52 of a suitable stuffing box body 53.

The upper surface of the boss 47 is provided with a pair of internally screw-threaded bolt holes (not shown) for receiving a pair of depending, externally screw-threaded pins (not shown) on the lower end of a pair of upright, supporting posts 54. The upper end of each of said posts are provided with a reduced, upstanding, co-axial pin (not shown), the upper ends of which are externally screw-threaded to receive nuts 55. These pins receive an annular piston chamber member 56 having an external, radially extending flange 57, that is formed with bolt holes for engaging over said reduced pins (not shown) on the upper ends of said posts 54. A concavo-convex cap 58 having a flange 59, similar to the flange 57, is mounted on said pins on top of a circular diaphragm disc 60, so that said nuts 55, bearing against the upper surface of said flange 59, will clamp said diaphragm 60 between the piston chamber 56 and its flange 57 and the cap 58 and its flange 59. The cap and the piston chamber are further bolted together by a number of short bolts 84 and nuts 85.

A flat, circular piston 61 is mounted within said piston chamber 56 beneath said diaphragm 60 and upon the upper end of a piston rod 62. The piston 61 and the piston rod 62 are clamped to said diaphragm 60 by a castellated nut 63 upon the upper surface of said diaphragm, so that said piston and said piston rod move with said diaphragm. An oblong spring support 64 surrounds said piston rod 62 and is mounted on said stud bolts 54 intermediate their ends for supporting and exerting a tension on a coil spring 65, the upper end of which engages beneath said piston 61. For adjusting the tension of said spring 65 on said piston, said piston rod and said diaphragm, a pair of nuts 66 and 67 are threaded onto each of said stud bolts 54 with the nuts 66 supporting said web 64 and the nuts 67 being above said web to lock the same against said nuts 66, so that by screwing the nuts 66 up or down the tension of said spring 65 may be increased or reduced, and the nuts 67 are tightened against said web to clamp the same against said nuts 66.

The piston rod 62 extends downwardly through the packing of the stuffing box body 53 and through the pin 52 thereof. The piston rod 62 is provided with an axial passageway 68 extending therethrough, so as to form a flow channel from said cap 58, through the castellations of said nut 63 and through said piston rod. The lower end of said piston rod is beveled or tapered, so as to form a frusto-conical seat 69 for engaging the seat 50 in the upper surface of the plug 49.

The upper surface of the crown 23 is provided on one side of center, diametrically opposite the boss 47, with an upstanding boss 70 which has an axial port 71 extending therethrough from said chamber 46. The lower portion of this port 71 is counterbored at 71' and threaded to receive a plug 72, which has an axial port 73 extending therethrough. The lower end of this port has a ground seat 74 formed thereon. The upper end of this port 71 is internally screw-threaded to receive the externally screw-threaded, depending pin 75 of a suitable stuffing box body 76. The upper surface of the boss 70 is provided with a pair of threaded bolt holes (not shown) for receiving a pair of depending, externally screw-threaded pins (not shown) on the lower end of a pair of upright, supporting posts 77, similar to the posts 54. The upper ends of each of said posts 77 are provided with a reduced, upstanding, co-axial pin (not shown), the upper ends of which are threaded to receive nuts 78. These pins also receive an annular, piston chamber member 79 having an external, radially extending flange 80, which is formed with bolt holes for engaging over said reduced pins (not shown) on the upper ends of said posts 77.

A concavo-convex cap 81, having a similar flange 82, is mounted on said pins on top of a circular, diaphragm disc 83, so that said nuts 78, bearing against the upper surface of said flange 82, will clamp said diaphragm 83 between the piston chamber 79 and its flange 80 and the cap 81 and its flange 82. The cap and the piston chamber are further bolted together by a number of short bolts 86 and nuts 87.

A flat, circular piston 88 is mounted within said piston chamber 79 beneath said diaphragm 83 and upon the upper end of a piston rod 89. The piston 88 and piston rod 89 are clamped to said diaphragm 83 by a nut 90 upon the upper surface of said diaphragm, so that said piston and said piston rod move with said diaphragm. An oblong spring support or web 91 surrounds said piston rod 89 and is mounted on said stud bolts 77 intermediate their ends for supporting and exerting a tension on a coiled spring 92, the upper end of which engages beneath said piston 88. For adjusting the tension of said spring 92 on said piston, said piston rod and said diaphragm, a pair of nuts 93 and 94 are threaded onto each of said stud bolts 77 with the nuts 93 supporting said web 91 and the nuts 94 being above said web to lock the same against said nuts 93, so that by screwing the nuts 93 up or down, the tension of said spring 92 may be increased or reduced, and the nuts 94 are tightened against said web to clamp the same against said nuts 93.

The piston rod 89 extends downwardly through the packing of the stuffing box body 76 and also through the pin 75 thereof. The lower end of said piston rod 89 is formed with a reduced, depending pin 95 which extends through the axial port 73 of said plug 72 and the lower end of said pin 95 is provided with an enlarged boss 96 having a conical seat 97 on its upper surface for engaging and co-acting with the seat 74 at the lower end of said port 73. The bore 71 of the boss 70 is provided with a radially extending, outlet port or passage 127, which extends therefrom through the wall of said crown 23, to form a bleed or outlet opening for said bore and the diaphragm actuating chamber 46 of said crown, whenever the valve 97 is in an open position (Figure 2).

The upper surface of the crown 23 is provided centrally with a smaller boss 98 having an axial bore or port 99 extending therethrough from said chamber 46. The upper end of said port 99 is internally screw-threaded to receive the depending pin 100 of a leak or check valve body 101. This body 101 has an axial bore 102 extending therethrough, the lower end of which is counterbored at 103 and a ground tapered seat 104 is formed therebetween. The upper end of said bore 102 is also counterbored at 105 and the upper portion of this counterbore 105 is internally screw-threaded to receive the depending, externally screw-threaded pin 106 of a cap or button 107. This buttton 107 is provided with a small, axial port 108 extending therethrough. A small, soft packing or sealing ring 109, preferably of "neoprene" or some other suitable material, is interposed between the lower end of the pin 106 and the shoulder formed between the bore 102 and the counterbore 105. It will be seen in Figures 2 and 3, that this ring 109 is clamped on this shoulder and held there by the pin 106 of said button 107. This ring 109 has a port 110 extending therethrough, which is the same size as said port 108 of said button. This soft ring 109 serves as a cushioning member and as a seat for a ball valve 111 mounted in said bore 102 (Figure 3).

The cap 58 is provided with an axial, screw-threaded port 112 for receiving the screw-threaded lower end of stud bolt 113. The lower portion of this bolt is provided with an axial bore or passageway 114 and the upper end of this passageway 114 is connected to a plurality of radial ports 115, which extend outwardly therefrom through the wall of said stud bolt. The cap 81 has a similar port 116 for receiving a stud bolt 117 that has an axial bore or passageway 118 in its lower portion, which terminates in radial ports 119, similar to the ports 115. It will be seen in Figures 1, 2 and 3, that these stud bolts 113 and 117 fasten and connect a hollow by-pass manifold 120 to said caps 58 and 81, so that by medium of said manifold 120 and said bolts 113 and 117 these caps are connected together in order that fluid may readily flow from one to the other. The manifold 120 has a boss 121 formed thereon intermediate its ends and preferably medially thereof, which has an internally screw-threaded bore 122 extending therethrough for receiving one end of an L 123. The other end of this L receives one end of a pipe 124 which extends therefrom to a pipe 125. This pipe 124 has a suitable strainer 126 mounted therein to remove and trap any foreign matter flowing through said pipe.

The pipe 17' is connected to the box 16' of said valve body 15 and is preferably one joint or length of the usual line pipe, although it may be any desired length. The other end of said pipe terminates in an externally screw-threaded pin 128, which engages within an internally screw-threaded box 129 of a coupling collar 130. The internally screw-threaded box 131 on the other end of said collar 130 receives an externally screw-threaded pin 132 of a cylindrical choke body 133. The other end of said choke body 133 is provided with an externally screw-threaded portion 134 for engaging within an internally screw-threaded box 135 of a coupling collar 136 and the opposite end of this collar has an internally screw-threaded box 137, which receives the externally screw-threaded pin 138 of the pipe 125. The pipe 124 may be connected into the pipe 125 wherever desired, and this pipe 125 leads to wherever the point of delivery is or the regulated pressure is desired. This may be in any one of the three hook-ups shown in my co-pending application, or may be in a straight line or field line, such as shown in Figure 1.

The choke 133 may be of any desired structure, although it is preferred to use a suitable bell choke, which has an axial, flared opening 139 extending therethrough and the upstream end of said choke has a removable flow bean jet 140 threaded thereinto. This jet is provided with a bore 141, of whatever diameter it is necessary to have the flow opening in said choke to restrict the flow of fluid through said choke, as desired. Thus, by installing a jet with the proper bore, any flow through said choke may be obtained. It will be seen that the restricted portion of said bore 141 of said jet 140 terminates in a flared passageway 142, that corresponds to the flared opening 139 of said choke 133, so that a continuous, flared opening or surface is had. The discharge or downstream end of said choke has an extended flange or lip 143, in order that said flared opening may be carried into the pipe or collar with a very slight difference between the inside diameter of said opening 139 and the inside diameter of said pipe or collar into which said choke discharges.

Figure 1:
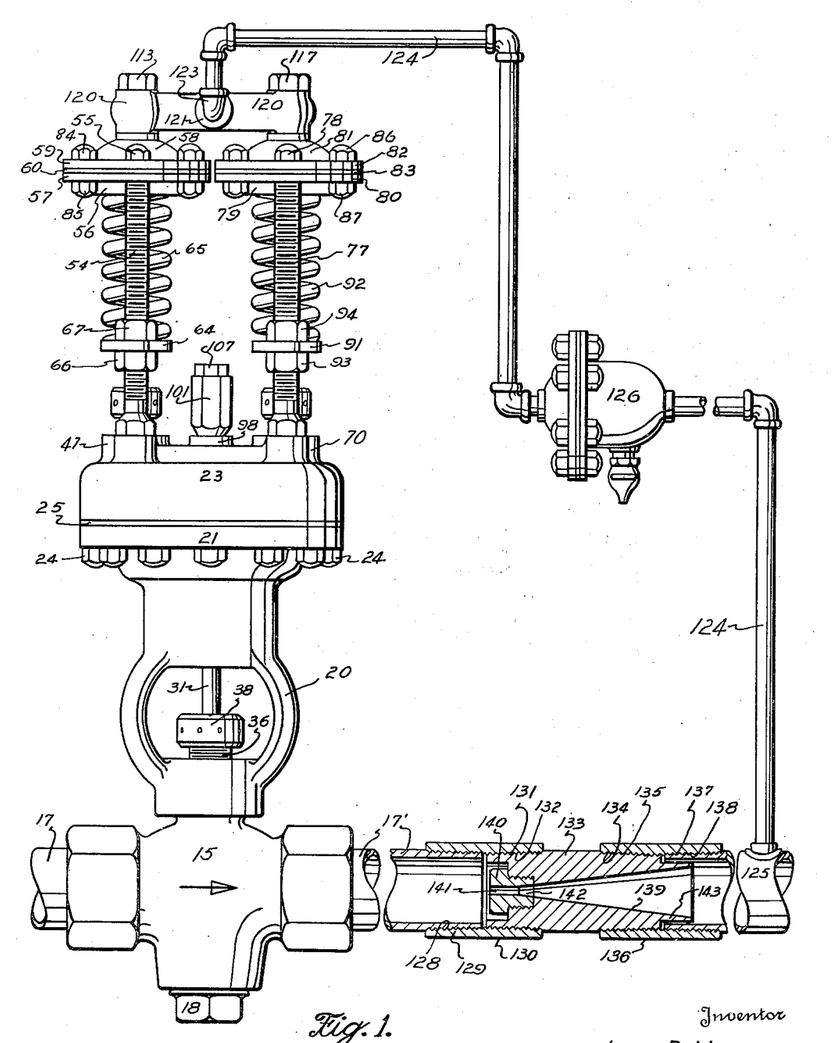
Figure 1 is a diagrammatic view showing a fluid flow control device, constructed in accordance with the invention, connected for operation in a flow line.

In operation, inasmuch as the regulator is used to reduce a relatively high pressure and sometimes a fluctuating pressure to a lower, steady pressure, I have shown one installation in Figure 1, although any one of the three different hook-ups shown in my co-pending application may be used as satisfactorily, or any other hook-up desired. The usual field line or high pressure supply line 17 is connected into the box 16 of the valve body 15 and the outlet box 16' receives the pin on one end of the connecting pipe 17'. Of course, the usual by-pass (not shown) with suitable, manually operated gate or shut-off valves (not shown) mounted therein, connects the pipe 17 with the pipe 17' around the regulator valve body 15. This is the usual structure and is not shown in detail in this application, although it is shown in my co-pending application.

The construction of this regulator is such as to enable the port 41 in the partition 43 to be fully opened or completely closed, so that when fluid is flowing through said valve body 15, its passage will not be restricted nor any reduction of pressure occur in said valve body across the port 41 of said partition. When said valve member 40 is in its open position, there will be approximately the same pressure in pipe 17' as there is in pipe 17. Naturally, a reduction in pressure will occur through said choke 133 and substantially the same reduced pressure thus carried in said pipe 125 will be present in said pipe 124, in said manifold 120, in said passageway 114 and said port 115 of said stud bolt 113, in passageway 118 and said port 119 of said stud bolt 117 and in said caps 58 and 81 on top of said diaphragms 60 and 83, as well as in said passageway 68 of said piston rod 62. The diaphragms 60 and 83 and pistons 61 and 88 will be in their upper position, as shown in Figure 3, with the result that the valve face 69 will not be engaging its seat 50, and that this same reduced pressure will be in said bore 48, said ports 51 and the diaphragm actuating chamber 46. This pressure will depress said diaphragm 25, as is shown in Figure 3, which moves said piston rod 31 downwardly to open the port 41 to permit the flow of pressure fluid from pipe 17 to pipe 17'. Attention is called to the fact that the spring 45 is under a very slight tension and when the piston rod 31 is moved downward slightly, where the valve face 40 does not contact its seat 42, then said valve member 40 drops to a full open position and stays there until the pressure is bled from the chamber 46, so as to permit the flow of fluid through the port 41 to pick up said rod and valve member to completely close the same, whereby a snap opening and closing of said valve is attained.

The by-pass manifold (not shown) is now closed and the regulator handles the flow of fluid from said pipe 17 to said pipe 17' and the continued flowing of fluid through said valve body 15 and said choke 133 will increase the pressure in said manifold 120 and in said diaphragm caps 58 and 81. The diaphragm 60 is then depressed, as is shown in Figure 2. When this occurs, the valve face 69 engages its seat 50 and closes off the admission of pressure fluid from said bore 68 of the piston rod 62 into said diaphragm actuating chamber 46. Due to the difference in the tensions set up on the springs 65 and 92, the piston rod 62 is moved downwardly and held in this position for some time before the piston rod 89 is moved downwardly. This adjustable difference in the tensions of said springs gives a selective pressure differential actuation for the control mechanism of said regulator.

The pressure will be held in said chamber 46, until the pressure in said diaphragm caps 58 and 81 and in said manifold 120 is great enough to overcome the tension of the spring 92 and depress the diaphragm 83. The depressing of this diaphragm will move the piston rod 89 downwardly, so that the valve face 97 is moved away from its seat 74 and this opens the port 73 to said chamber 46, whereby fluid may flow from said chamber, through said port 73, into said bore 71 and out of said opening 127 to the atmosphere. This bleeding of pressure fluid from said chamber 46 will remove the pressure from the diaphragm 25 and permit the flow of fluid through said port 41 to lift said piston 28 and close said valve member 40 in said port 41. The adjusting of the spring 65 controls the pressure at which said spring lifts said piston rod 62 to open the valve face 69 from its seat 50 and introduce pressure on top of said diaphragm 25, as well as the pressure at which said valve face is again seated. Also, the spring 92 may be regulated to adjust the pressure at which said piston rod 89 is moved up and down to control the opening of said valve face 97 on its seat 74.

When the piston rod 62 is lifted to admit pressure fluid from said bore 68 into said chamber 46, flow of fluid through the bore 103 of said pin 100 of said leak valve body 101 will lift said ball 111 off its seat 104. This is due to the close fitting of said ball 111 in said bore 102, the velocity of the fluid flowing therethrough will carry said ball therewith until it engages the lower end of the bore 110 of the soft ring 109, which seals and terminates the flow or escape of fluid from said check valve body 101. The piston rod 62 is moved downwardly to seat the valve face 69 in its seat 50 and terminate the admission of pressure fluid to said chamber 46. The piston rod 89 is moved downwardly to move the valve face 97 from its seat 74 and open the port 73 to bleed the pressure fluid from said chamber 46 and after the pressure has been substantially bled from said chamber, the ball 111 will then drop into its seat 104. This leak valve 101 is provided in case there should be a slight leak between the valve face 69 and its seat 50 and this small leak will lift said ball 111 and escape through the port 108 of said button 107 without carrying said ball up against said ring 109. Thus the provision of the leak valve body 101 prevents the accidental accumulation of pressure fluid in said chamber 46, which could be sufficient to depress said diaphragm 25 and accidentally open the port 41 when it is not desired. It will be seen that a simple and very efficient regulator is had and one which overcomes the serious objections to substantially all of the regulators now on the market. These are the tendency to freeze, caused by reduction of pressure fluid occurring in said valve body 15, is eliminated, as well as the reduction of the number of times said valve member has to be opened to maintain a desired pressure in said pipe 125 or other work where the reduced pressure is used.

While the invention has been shown and described as controlling and regulating the flow of a fluid through a line, the invention is not to be limited to this one use, as it may be readily and easily changed to hold and maintain a predetermined back pressure on a flow line.

Various changes, alterations and modifications may be made in the shape, size and arrangement of the herein described elements, within the scope of the appended claims.

What I claim and desire to secure by Letters Patent is:

1. In a pressure regulator including, a housing, fluid flow control means mounted in the housing for controlling the flow of fluid through said housing and adapted to close with the flow of fluid, said flow control means being so constructed as to be either fully opened or completely closed and eliminating any intermediate positions, whereby said flow control means discharges substantially the same pressure as received, fluid operated means connected to the delivery side of the regulator for actuating said control means, means for governing the application of the discharged fluid to said fluid operated means, means for releasing the discharged fluid from said fluid operated means to the atmosphere, and means connected to the delivery side of the regulator for governing the operation of said releasing means.

2. In a pressure regulator including, a housing, fluid flow control means mounted in the housing for controlling the flow of fluid through said housing and adapted to close with the flow of fluid, said flow control means being so constructed as to be either fully opened or completely closed and eliminating any intermediate positions, whereby said flow control means discharges substantially the same pressure as received, fluid operated means connected to the delivery side of the regulator for actuating said control means, means for governing the application of the discharged fluid to said fluid operated means, means for releasing the discharged fluid from said fluid operated means to the atmosphere, means connected to the delivery side of the regulator for controlling the operation of said releasing means, and means for preventing the accidental operation of said fluid operated means.

3. In a pressure regulator including, a housing, fluid flow control means mounted in the housing for controlling the flow of fluid through said housing and adapted to close with the flow of fluid, said flow control means being so constructed as to be either fully opened or completely closed and eliminating any intermediate positions, whereby said flow control means discharges substantially the same pressure as received, fluid operated means connected to the delivery side of the regulator for actuating said control means, and adjustable means for governing the application of the discharged fluid to said fluid operated means, means for releasing the discharged fluid from said fluid operated means to the atmosphere, and means connected to the delivery side of the regulator for governing the operation of said releasing means.

4. In a pressure regulator including, a housing, fluid flow control means mounted in the housing for controlling the flow of fluid through said housing and adapted to close with the flow of fluid, said flow control means being so constructed as to be either fully opened or completely closed and eliminating any intermediate positions, whereby said flow control means discharges substantially the same pressure as received, fluid operated means connected to the delivery side of the regulator for actuating said control means, an adjustable means for governing the application of the discharged fluid to said fluid operated means, means for releasing the discharged fluid from said fluid operated means to the atmosphere, and an adjustable means for controlling the operation of said releasing means.

5. In a pressure regulator including, a housing, fluid flow control means mounted in the housing for controlling the flow of fluid through said housing and adapted to close with the flow of fluid, said flow control means being so constructed as to be either fully opened or completely closed and eliminating any intermediate positions, whereby said flow control means discharges substantially the same pressure as received, fluid operated means connected to the delivery side of the regulator for actuating said control means, an adjustable means for governing the application of the discharged fluid to said fluid operated means, means for releasing the discharged fluid from said fluid operated means to the atmosphere, an adjustable means connected to the delivery side of the regulator for controlling the operation of said releasing means, and means for preventing the accidental operation of said operated means.

6. In an apparatus for regulating the flow of a fluid including, valve means for controlling the flow of a fluid and adapted to be closed by the flow of fluid through the apparatus, said valve means being so constructed as to be either fully opened or completely closed and eliminating any intermediate positions, whereby said flow control means discharges substantially the same pressure as received, fluid operated means for actuating the valve means, an adjustable means for governing the application of an actuating fluid to said first operated means, means for releasing the actuating fluid from said fluid operated means to the atmosphere, and an adjustable means operated by the actuating fluid for controlling the operation of said releasing means.

7. In an apparatus for regulating the flow of a fluid including, valve means for controlling the flow of a fluid and adapted to be closed by the flow of fluid through the apparatus, said valve means being so constructed as to be either fully opened or completely closed and eliminating any intermediate positions, whereby said flow control means discharges substantially the same pressure as received, fluid operated means for actuating the valve means, an adjustable means for governing the application of an actuating fluid to said fluid operated means, means for releasing the actuating fluid from said fluid operated means to the atmosphere, an adjustable means operated by the actuating fluid for controlling the operation of said releasing means, and means for preventing the accidental operation of said fluid operated means.

8. In an apparatus for regulating the flow of a fluid including, valve means for controlling the flow of a fluid and adapted to be closed by the flow of fluid through the apparatus, said valve means being so constructed as to be either fully opened or completely closed and eliminating any intermediate positions, whereby said flow control means discharges substantially the same pressure as received, fluid operated means for actuating the valve means, means for applying the reduced pressure of the regulating apparatus to the fluid operated means, means for releasing this pressure from said operated means to the atmosphere, and means having an exterior adjusting device and actuated by the reduced pressure of the regulating apparatus for controlling the operation of said releasing means.

9. In an apparatus for regulating the flow of a fluid including, valve means for controlling the flow of a fluid and adapted to be closed by the flow of fluid through the apparatus, said valve means being so constructed as to be either fully opened or completely closed and eliminating any intermediate positions, whereby said flow control means discharges substantially the same pressure as received, fluid operated means for actuating the valve means, means for applying the reduced pressure of the regulating apparatus to the fluid operated means, means for releasing this pressure from said fluid operated means to the atmosphere, means actuated by the reduced pressure of the regulating apparatus for controlling the operation of said releasing means, and means for preventing the accidental operation of said fluid operated means.

10. A regulator including, a fluid flow control body, valve means in the body and adapted to be closed by the flow of fluid through said body, said valve means being so constructed as to be either fully opened or completely closed and eliminating any intermediate positions, whereby said flow control means discharges substantially the same pressure as received, diaphragm means for actuating the valve means, fluid actuated means for controlling the flow of a pressure fluid onto said diaphragm operated means, and fluid actuated means operated by the pressure fluid for releasing the pressure fluid from said diaphragm operated means to the atmosphere to discontinue the operation of said diaphragm operated means when the desired pressure has been obtained.

11. A regulator including, a fluid flow control body, valve means in the body and adapted to be closed by the flow of fluid through said body, the valve means being so constructed as to be either fully opened or completely closed and eliminating any intermediate positions, whereby said flow control means discharges substantially the same pressure as received, diaphragm operated means for actuating the valve means, fluid actuated means for controlling the flow of a pressure fluid onto said diaphragm operated means, fluid actuated means operated by the pressure fluid for releasing the pressure fluid from said diaphragm means to the atmosphere to discontinue the operation of said diaphragm operated means when the desired pressure has been obtained, and means for preventing the accidental accumulation of a pressure fluid on said diaphragm operated means to actuate said diaphragm operated means and said valve means.

12. In a pressure regulator including, a housing, fluid flow control means mounted on the housing for controlling the flow of fluid through said housing, said flow control means being so constructed as to be either fully opened or completely closed, a pressure reducer connected to the delivery side of the housing for reducing the pressure of the fluid flowing through the housing and the flow control means, fluid operated means connected to the delivery side of housing for actuating said control means, means for governing the application of the discharged fluid to said fluid operated means, means for releasing the discharged fluid from said fluid operated means, and means connected to the delivery side of the pressure reducer for governing the operation of said releasing means.

13. In a pressure regulator including, a housing, fluid flow control means mounted on the housing for controlling the flow of fluid through said housing, said flow control means being so constructed as to be either fully opened or completely closed, a pressure reducer connected to the delivery side of the housing for reducing the pressure of the fluid flowing through the housing and the flow control means, fluid operated means connected to the delivery side of the pressure reducer for actuating said control means, means for governing the application of the discharged fluid to said fluid operated means, means for releasing the discharged fluid from said fluid operated means, means connected to the delivery side of the regulator for controlling the operation of said releasing means, and means for preventing the accidental operation of said fluid operated means.

14. In a pressure regulator including, a housing, fluid flow control means mounted on the housing for controlling the flow of fluid through said housing, said flow control means being so constructed as to be either fully opened or completely closed, a pressure reducer connected to the delivery side of the housing for reducing the pressure of the fluid flowing through the housing and the flow control means, fluid operated means connected to the delivery side of the pressure reducer for actuating said control means, and adjustable means for governing the application of the discharged fluid to said fluid operated means, means for releasing the discharged fluid from said fluid operated means, and means connected to the delivery side of the regulator for governing the operation of said releasing means.

15. In a pressure regulator including, a housing, fluid flow control means mounted on the housing for controlling the flow of fluid through said housing, said flow control means being so constructed as to be either fully opened or completely closed, a pressure reducer connected to the delivery side of the housing for reducing the pressure of the fluid flowing through the housing and the flow control means, fluid operated means connected to the delivery side of the pressure reducer for actuating said control means, an adjustable means for governing the application of the discharged fluid to said fluid operated means, means for releasing the discharged fluid from said fluid operated means, and an adjustable means for controlling the operation of said releasing means.

16. In a pressure regulator including, a housing, fluid flow control means mounted on the housing for controlling the flow of fluid through said housing, said flow control means being so constructed as to be either fully opened or completely closed, a pressure reducer connected to the delivery side of the housing for reducing the pressure of the fluid flowing through the housing and the flow control means, fluid operated means connected to the delivery side of the pressure reducer for actuating said control means, said adjustable means for governing the application of the discharged fluid to said fluid operated means, means for releasing the discharged fluid from said fluid operated means, an adjustable means connected to the delivery side of the regulator for controlling the operation of said releasing means, and means for preventing the accidental operation of said fluid operated means.

17. In an apparatus for regulating the flow of a fluid including, valve means for controlling the flow of a fluid and adapted to be closed by the flow of the fluid through the apparatus, said valve means being so constructed as to be either fully opened or completely closed and eliminating any intermediate positions, whereby said flow control means discharges substantially the same pressure as received, restricting means connected to the delivery side of the valve means for reducing the pressure of the fluid flowing through the valve means, fluid operated means for actuating the valve means, an adjustable means for governing the application of an actuating fluid to said fluid operated means, means for releasing the actuating fluid from said fluid operated means to the atmosphere, and an adjustable means operated by the actuating fluid for controlling the operation of said releasing means.

18. In an apparatus for regulating the flow of a fluid including, valve means for controlling the flow of a fluid and adapted to be closed by the flow of the fluid through the apparatus, said valve means being so constructed as to be either fully opened or completely closed and eliminating any intermediate positions, whereby said flow control means discharges substantially the same pressure as received, restricting means connected to the delivery side of the valve means for reducing the pressure of the fluid flowing through the valve means, fluid operated means for actuating the valve means, an adjustable means for governing the application of an actuating fluid to said fluid operated means, means for releasing the actuating fluid from said fluid operated means to the atmosphere, an adjustable means operated by the actuating fluid for controlling the operation of said releasing means, and means for preventing the accidental operation of said fluid operated means.

19. In an apparatus for regulating the flow of a fluid including, valve means for controlling the flow of a fluid and adapted to be closed by the flow of the fluid through the apparatus, said valve means being so constructed as to be either fully opened or completely closed and eliminating any intermediate positions, whereby said flow control means discharges substantially the same pressure as received, restricting means connected to the delivery side of the valve means for reducing the pressure of the fluid flowing through the valve means, fluid operated means for actuating the valve means, means for applying the reduced pressure of the regulating apparatus to the fluid operated means, means for releasing this pressure from said operated means to the atmosphere, and means having an exterior adjusting device and actuated by the reduced pressure of the regulating apparatus for controlling the operation of said releasing means.

20. In an apparatus for regulating the flow of a fluid including, valve means for controlling the flow of a fluid and adapted to be closed by the flow of the fluid through the apparatus, said valve means being so constructed as to be either fully opened or completely closed and eliminating any intermediate positions, whereby said flow control means discharges substantially the same pressure as received, restricting means connected to the delivery side of the valve means for reducing the pressure of the fluid flowing through the valve means, fluid operated means for actuating the valve means, means for applying the reduced pressure of the regulating apparatus to the fluid operated means, means for releasing this pressure from said fluid operated means to the atmosphere, means actuated by the reduced pressure of the regulating apparatus for controlling the operation of said releasing means, and means for preventing the accidental operation of said fluid operated means.

21. A regulator including, a fluid flow control body, valve means in the body and adapted to be closed by the flow of fluid through the body, said valve means being so constructed as to be either fully opened or completely closed and eliminating any intermediate positions, whereby said flow control means discharges substantially the same pressure as received, restricting means connected to the delivery side of said body for reducing the pressure of the fluid flowing through said body and said valve means, diaphragm means for actuating the valve means, fluid operated means for controlling the flow of a pressure fluid onto said diaphragm operated means, and fluid actuated means operated by the pressure fluid for releasing the pressure fluid from said diaphragm operated means to the atmosphere to discontinue the operation of said diaphragm operated means when the desired pressure has been obtained.

22. A regulator including, a fluid flow control body, valve means in the body and adapted to be closed by the flow of fluid through said body, the valve means being so constructed as to be either fully opened or completely closed and eliminating any intermediate positions, whereby said flow control means discharges substantially the same pressure as received, restricting means connected to the delivery side of said body for reducing the pressure of the fluid flowing through said body and said valve means, diaphragm operated means for actuating the valve means, fluid operated means for controlling the flow of a pressure fluid onto said diaphragm operated means, fluid actuated means operated by the pressure fluid for releasing the pressure fluid from said diaphragm means to the atmosphere to discontinue the operation of said diaphragm operated means when the desired pressure has been obtained, and means for preventing the accidental accumulation of a pressure fluid on said diaphragm operated means to actuate said diaphragm operated means and said valve means.

JEDDY D. NIXON.